United States Patent [19]

Grimm et al.

[11] Patent Number: 4,895,410

[45] Date of Patent: Jan. 23, 1990

[54] SLIDING AND LIFTING ROOFS FOR AUTOMOBILES

[75] Inventors: Rainer Grimm, Wetzlar; Horst Böhm, Frankfurt, both of Fed. Rep. of Germany

[73] Assignee: Rockwell-Golde G.m.b.H., Fed. Rep. of Germany

[21] Appl. No.: 226,696

[22] Filed: Aug. 1, 1988

[30] Foreign Application Priority Data

Aug. 4, 1987 [DE] Fed. Rep. of Germany ....... 3725727

[51] Int. Cl.⁴ .............................................. B60J 7/05
[52] U.S. Cl. ................................... 296/214; 296/221; 296/223
[58] Field of Search ....................... 296/214, 221, 223

[56] References Cited

U.S. PATENT DOCUMENTS

| 4,679,846 | 7/1987 | Lux et al. ............................. 296/214 |
| 4,722,565 | 2/1988 | Kanou et al. ..................... 296/214 X |
| 4,802,707 | 2/1989 | Schlapp ................................. 296/214 |

FOREIGN PATENT DOCUMENTS

| 2648664 | 5/1978 | Fed. Rep. of Germany ...... 296/221 |
| 2094723 | 9/1982 | United Kingdom ................ 296/221 |

*Primary Examiner*—Dennis H. Pedder

[57] ABSTRACT

In a sliding-lifting roof for an automobile, of which a sliding lid can be actuated, by the engagement of guide pins, mounted on rear, driven sliding shoes, in guide blocks fixed to the sliding lid, the sliding lid is covered below by a liner, connected with it for common displacement, which liner is formed of a non-pivotal lower part and a flap component hinged thereto. The flap component is, in lifting movements and pivoting-in movements of the sliding lid, pivoted correspondingly, but in the starting phase of the lifting movement with lead compared with the sliding lid, as a result of control ramps fitted to the liner lower part and of lifting levers, pivotally connected to the rear sliding shoes and co-operating with the ramps. As a result, when only a small lifting angle of the sliding lid takes place, a sufficiently wide ventilation gap is obtained between the liner lower part and the liner flap.

11 Claims, 5 Drawing Sheets

FIG. 9

SLIDING AND LIFTING ROOFS FOR AUTOMOBILES

FIELD OF THE INVENTION

This invention relates to sliding and lifting roofs for automobiles.

DESCRIPTION OF THE PRIOR ART

One form of a known sliding and lifting roof for an automobile, hereinafter sometimes referred to as a "sliding-lifting roof" comprises a rigid sliding lid, which is guided with front and rear sliding shoes on guide rails fixed laterally in a roof opening on a sliding roof frame, is driven by cables guided in compression-stiff manner and acting on the rear sliding shoes, is pivotally journalled by pivot bearings mounted on the front sliding shoes about a horizontal axis extending transversely to the sliding direction and is equipped, along its lateral edges, with guide blocks fixed to it, into which guide pins mounted on the rear sliding shoes engage, with the result that the sliding lid, starting from its closed position, may either be raised as desired in the manner of front-hinged ventilation flaps by raising its rear edge above the fixed roof surface or, after lowering its rear edge, can be slid beneath the rear, fixed roof surface, the sliding lid being covered on its lower face by a liner connected with it and slidable together with it, which liner consists of two plate-shaped components, of which a lower component does not participate in the pivotal movements of the sliding lid and is furnished with a ventilation opening, which is covered in the closed position and in sliding positions of the sliding lid by the other component, which is connected in the manner of a flap with the lower component, and is pivoted upwards in lifting movements of the sliding lid, but is held down, in the closed position and in every sliding position of the sliding lid, in its closed position covering the ventilation opening by lifting levers pivotally connected with the rear sliding shoes, which lifting levers pivot in forced manner during lifting movements of the sliding lid.

In known sliding-lifting roofs of this form of construction (DE-PS No. 26 48 664 and DE-PS No. 31 05 717), lifting levers are pushed pivotally onto guide pins of the rearward sliding shoes and engage, with guide journals fixed to them, into guide blocks of a sliding lid, with the result that the lifting levers, in lifting movements of the sliding lid, pivot in forced manner. The guide journals are extended to form holding-down devices, which, in the closed position and every sliding position of the sliding lid, bear against ramps fixed to a liner flap and thereby hold down the liner flap, which is prestressed in an opening direction by springs mounted on its hinge elements, in its closed position covering a ventilation opening and lying flat against a lower part of the liner. If the sliding lid is raised by a forward sliding movement of the guide pins in the guide blocks, then the guide pins that also slide forwards in the guide blocks pivot the lifting levers, with the result that the holding-down devices, following the track in the blocks, are guided forwards and upwards. The holding-down devices here displace with respect to the ramps, so that the springs can pivot the liner flap upwards in the opening direction.

Due to the dependence of the pivoting-out movement of the liner flap upon the displacement of the holding-down device constrained by the guide blocks, in these known sliding-lifting roofs, when a small lifting displacement of the sliding lid takes place, only a correspondingly small opening pivotal movement of the liner flap and thus only a relatively small air gap between the lower part of the liner and the liner flap are achieved. It is only when larger lifting movements of the sliding lid occur that, when the liner flap abuts the lower face of the sliding lid, a large air gap is obtained. This movement characteristic of the liner flap is a disadvantage when the sliding lid, for example during travelling in winter or rain, is raised only slightly, because then only a very small and therefore inadequate ventilation gap is obtained between the liner lower part and liner flap. A further disadvantage of these known sliding-lifting roofs can be seen in the fact that, in closure pivoting movements of the sliding lid and the resultant forced closure pivoting movements of the liner flap, the force of the springs acting upon the liner flap must be overcome by correspondingly increased actuation forces.

In a further known sliding-lifting roof (DE-PS No. 34 42 615), a liner sliding component which can be raised is coupled, at at least one of its sides, to a pivotal lifting arm, the pivotal movement of which is controlled in forced manner as a function of the movement of a lifting lever engaging with it of the lifting device provided on this side of the lid, this forced control corresponding to a pivotal movement characteristic which differs from the pivotal movement characteristic of the lid. As a result, it is indeed achievable for this special sliding-lifting roof construction, that when the lid is raised the starting phase of the outward pivotal movement of the sliding liner, starting from the closed position of the lid, is more rapid than the lifting movement of the lid, so that even at the start a larger ventilation gap can be achieved, but this form of construction, on account of the different construction of the lifting device, cannot be used for sliding-lifting roofs of the type described in the opening paragraph.

OBJECT OF THE INVENTION

An object of the present invention is to so construct a sliding-lifting roof of the type described in the opening paragraph of the above description of the prior art, that in the starting phase, starting from the closed position of the lid, the pivotal movement of the liner flap takes place more rapidly than the lifting movement of the sliding lid, in order that, even with a slight lifting movement of the lid, a sufficiently large air gap can be obtained between the lower part of the liner and the liner flap.

SUMMARY OF THE INVENTION

According to the present invention, there is provided a sliding-lifting roof for an automobile, comprising a rigid sliding lid, which is guided with front and rear sliding shoes on guide rails fixed laterally in a roof opening on a sliding roof frame, is driven by cables guided in compression-stiff manner and acting on the rear sliding shoes, is pivotally journalled by pivot bearings mounted on the front sliding shoes about a horizontal axis extending transversely to the sliding direction and is equipped, along its lateral edges, with guide blocks fixed to it, into which guide pins mounted on the rear sliding shoes engage, with the result that the sliding lid, starting from its closed position, may either be raised as desired in the manner of front-hinged ventilation flaps by raising its rear edge above the fixed roof surface or, after lowering its rear edge, can be slid beneath the rear, fixed roof surface, the sliding lid being covered on its lower face by a liner connected with it and slidable together with it, which liner consists of two plate-shaped components, of which a lower component does not participate in the pivotal movements of the sliding lid and is furnished with a ventilation opening, which is covered in the closed position and in sliding positions of the sliding lid by the other component, which is connected in the manner of a flap with the lower component, and is pivoted upwards in lifting movements of the sliding lid, but is held down, in the closed position and in every slid position of the sliding lid, in its closed position covering the ventilation opening by lifting levers pivotally connected with the rear sliding shoes, which lifting levers pivot in forced manner during lifting movements of the sliding lid; the roof being such that each lifting lever slidably engages by a bearing journal, situated at its outer end, into a lifting block mounted laterally on the liner flap and bears, with a bearing element, situated between its pivot bearing position on the rear sliding shoe and the bearing journal, on a control ramp, which is disposed between the guide block and the lifting block and is fixed to the lower part of the liner; and the control ramp comprises three successive, adjoining portions for supporting the bearing element, of which a first portion, associated with the closed position and every sliding movement of the sliding lid, extends parallel to the guide rail, and a second portion, associated with the starting phase of the lifting movement of the sliding lid, ascends forwards and upwards, which second portion is followed by a third portion, associated with the lifting movement of the sliding lid which follows the starting phase.

The control ramp determines, in conjunction with the lifting lever, the desired forced controlled movement-characteristic of the liner flap, in such a manner that the liner flap moves faster than the sliding lid in the initial phase of the outward opening movement. This forced control of the liner flap takes place completely independently of the movement of the guide blocks of the sliding lid. The lead in the pivotal movement of the liner flap ahead of the lifting, pivotal movement of the sliding lid is determined essentially by the ascent and length of the second portion of the control ramp and by the associated lengths of lever between the pivot bearing position, the bearing element and the bearing journal on the lifting lever. The present construction enables there to be an effective air gap between liner flap and liner lower part with only a slight upward outward movement of the sliding lid.

It is possible for the third portion of the control ramp to ascend forwards and upwards, but at a smaller angle of ascent than the second portion. The result is thus achieved that the liner flap has not yet reached its maximum opening angle when the bearing element of the lifting lever has travelled the complete sliding distance upon the second portion of the control ramp. After this starting phase of the leading movement, the liner flap, during sliding of the bearing element upon the third portion of the control ramp with continuing lifting pivotal movement of the sliding lid, pivots upwards still further until, at the end of the lifting movement of the sliding lid, it strikes the lower side of the lid.

Alternatively, the third portion of the control ramp can extend parallel to the first portion. In contrast described in the paragraph above, the liner flap already reaches the abutment position against the sliding lid when the bearing element of the lifting lever has arrived at the end of its sliding travel on the second portion of the control ramp. With continued lifting pivotal movement of the sliding lid from this point, the bearing element slides, without further pivoting of the liner flap, on the third portion of the control ramp.

With advantage, the pivot bearing positions of the lifting levers are spatially separated from the respective adjacent guide pins on the rear sliding shoes.

Here, it is advantageous if the pivot bearing positions are disposed both horizontally and vertically, with respect to the associated guide pins and are further from the sliding lid than the guide pins.

The terms "forwards" or "front" respectively and "rear" or "backwards", used in connection with the sliding-lifting roof of this invention and its components, relate to the normal, forward direction of travel of the automobile into which the sliding-lifting roof is incorporated.

BRIEF DESCRIPTION OF THE DRAWINGS

For a better understanding of the invention, and to show how the same may be carried into effect, reference will now be made, by way of example, to the accompanying drawings, in which.

DESCRIPTION OF THE PREFERRED EMBODIMENTS

In the drawings, only the left-hand side of the sliding-lifting roof and its components, in respect of the forward travel direction of the automobile, is shown. The right-hand side of the sliding-lifting roof is to opposite hand and is therefore not further described.

Figure 1:
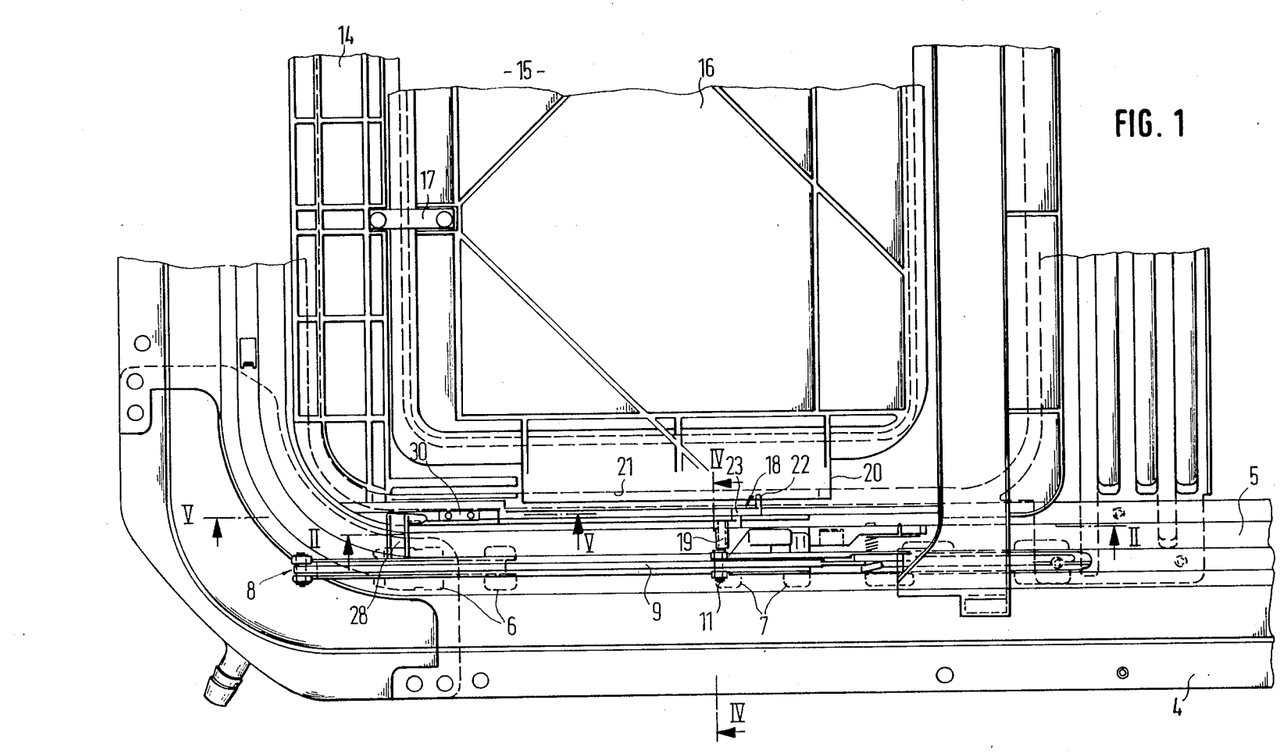
FIG. 1 is a plan view of part of a sliding roof frame and a lid liner, with the sliding lid removed.
Figure 4:
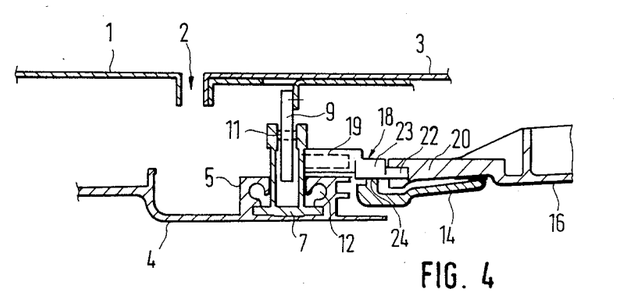
FIG. 4 is a section taken along the line IV—IV in FIG. 1.
Figure 5:
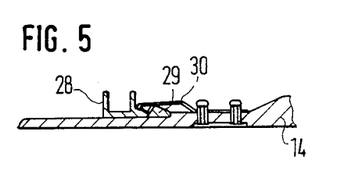
FIG. 5 is a section taken along the line V—V in FIG. 1.

The sliding-lifting roof illustrated in the drawings consists basically of the following components, namely a fixed automobile roof 1 with a roof opening 2, a rigid sliding lid 3, associated with the roof opening, a single-piece sliding roof frame 4, fixed beneath the roof opening 2 to the fixed automobile roof 1, a guide rail 5, fixed to the sliding roof frame 4, a front sliding shoe 6, slidably guided on the guide rail 5, a rear sliding shoe 7, likewise slidably guided on the guide rail 5, a pivot bearing 8 mounted on the front sliding shoe for the pivotal mounting of the sliding lid 3 about an axis transverse to the direction of sliding, a guide block 9 (FIG. 4), fixed in the vicinity of the lateral edge of the sliding lid 3 and parallel to it on the sliding lid, which guide block connects the front sliding shoe 6 with the rear sliding shoe 7, a guide pin 11, mounted on the rear sliding shoe 7 and engaging into a guide slit 10 of the guide block 9, a cable 13 for the drive of the sliding lid 3, guided in compression-stiff manner in a channel 12 of the guide rail 5 and firmly connected with the rear sliding shoe 7, a plate-shaped liner lower part 14, slidable jointly with the sliding lid 3 and covering its lower face, a ventilation opening 15, formed in the liner lower part 14 and making the latter into the shape of a frame, a liner flap 16, closing the ventilation opening 15 from above in the closed position, a hinge element 17, connecting the liner flap 16 with the lower part 14 of the liner, which hinge element is shown in FIG. 1 as a flexible hinge strip, and a lifting lever 18, which is pivotally connected at a pivot bearing position 19 to the rear sliding shoe 7.

Figure 2:
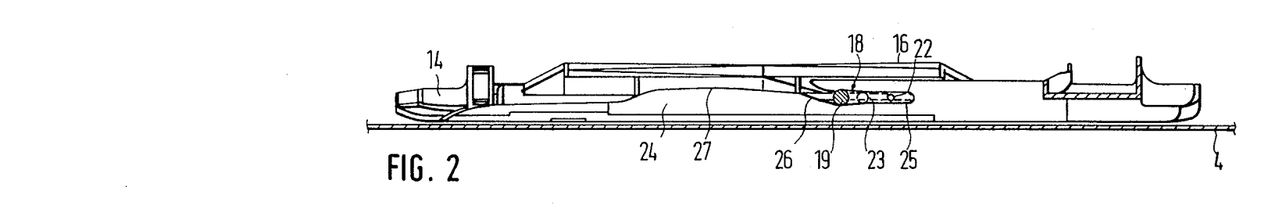
FIG. 2 is a section taken along the line II—II in FIG. 1, illustrated in the closed position of the liner flap.
Figure 6:
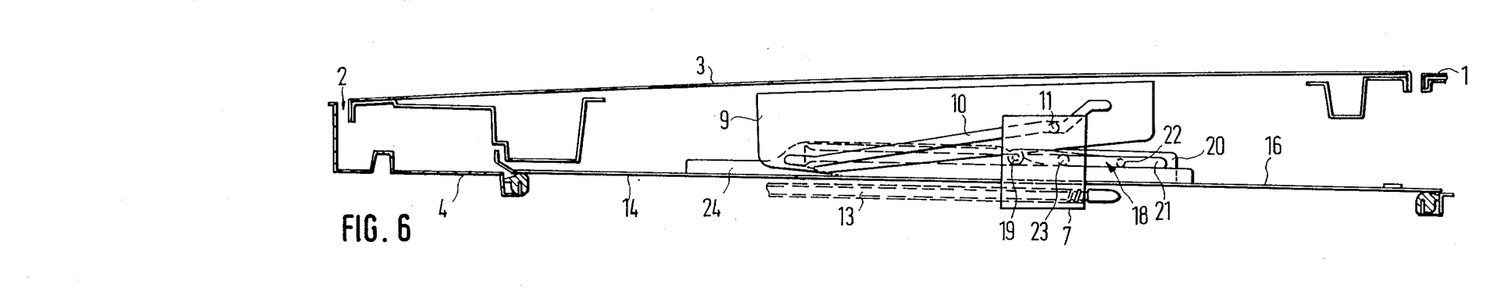
FIG. 6 is a schematic longitudinal section through the complete, closed sliding-lifting roof in an alternative form of construction.
Figure 7:
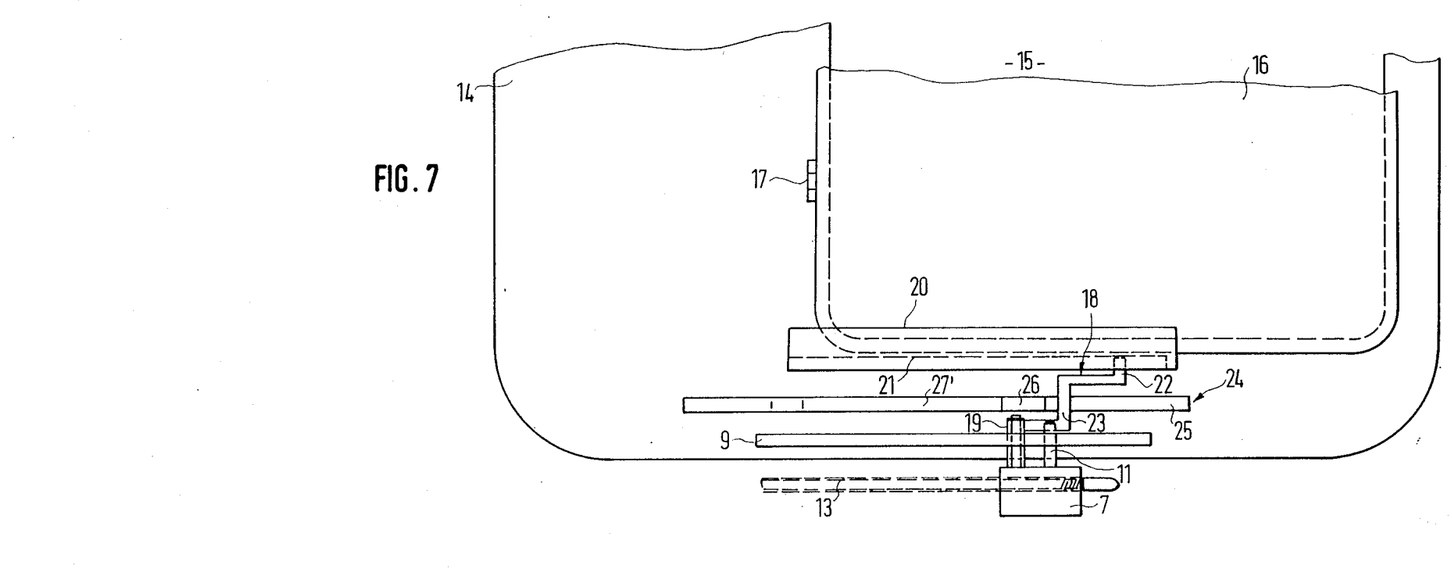
FIG. 7 is a schematic plan view showing part of the liner and the functional elements of the sliding lid and of the liner flap shown in FIG. 6.
Figure 8:
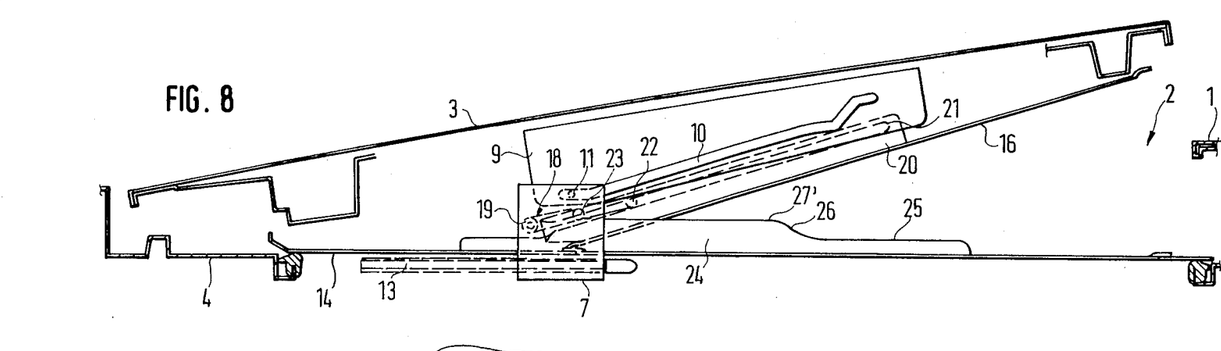
FIG. 8 is a view similar to FIG. 6 but with the sliding lid raised and liner flap opened.
Figure 9:
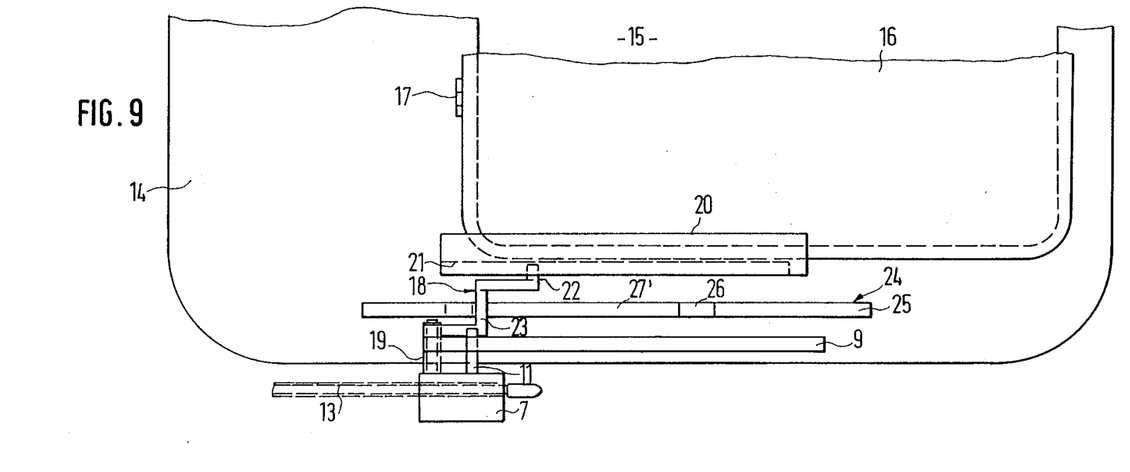
FIG. 9 is a schematic plan view of part of the liner, similar to FIG. 7, but with functional elements situated in the opened position.

Laterally on the lining flap 16 there is a lifting block 20, firmly connected thereto, which in the example of embodiment illustrated in FIGS. 1 to 5 is injection moulded from plastics material in one piece with the liner flap 16. In the lifting block 20 there is a guide slit 21, open at the front for reasons of assembly. A bearing journal 22, situated at the outer end of the lifting lever 18, engages slidably into the guide slit 21 of the lifting block 20 and is rotatable there about its axis. The lifting lever 18, as can be particularly seen from FIGS. 7 and 9, is cranked several times, a bearing element 23 being formed between its pivot bearing position 19 and its bearing journal 22. The pivot bearing position, bearing element 23 and bearing journal 22 are axially parallel to one another. The bearing element 23 is, for example, like the bearing journal, of cylindrical form, but for achieving an additional pivotal movement component for the liner flap 16, it may also be of oval section. As can be seen from the drawings, the axes of the pivot bearing position 19, bearing element 23 and bearing journal 22 lie in one common plane, which is generally parallel to the liner 14, 16 in the closed position of the sliding lid (FIGS. 2 and 6).

As can again be seen most clearly from FIGS. 7 and 9, between the guide block 9 and lifting block 20 and parallel to these, there is a control ramp 24, fixed to the liner lower part 14, on which ramp the lifting lever 18 bears with its bearing element 23. In the embodiment according to FIGS. 1 to 5, the control ramp 24 is injection moulded in one piece from plastics material with the liner lower part 14.

The control ramp 24 is, in both embodiments shown in the drawings, namely FIGS. 1 to 5 on the one hand and FIGS. 6 to 9 on the other hand, substantially of the same form. Starting from the rear, its bearing surface for the bearing element 23 is composed of three successively adjoining portions 25, 26 and 27 or 27'. In the closed position and in every slid position of the sliding lid 3, the lifting lever 18 bears with its bearing element 23 against the first section 25. During the starting phase of the lifting movement of the sliding lid 3, in contrast, the bearing element 23 slides on the relatively steep, forwardly and upwardly inclined, second portion 26. Next in the time sequence, the bearing element 23 slides, as the lifting movement of the sliding lid 3 continues, on the third portion 27, 27' respectively. The portion 25 extends, in both forms of embodiment, generally parallel to the liner 14, 16 and thus also to the guide rail 5. In the embodiment shown in FIGS. 1 to 5, the third portion 27 also ascends forwards and upwards, but with a substantially smaller angle of ascent than the second portion 26. In the embodiment shown in FIGS. 6 to 9, the third portion 27' is parallel to the first portion 25. The consequences arising from the different forms of the control ramp 24 during the movement sequence are explained below.

As can be seen from FIGS. 7 and 9, the pivot bearing position 19 is axially parallel to the guide pin 11 on the rear sliding shoe 7. The arrangement here is such that the pivot bearing position 19 is situated below and in front of the guide pin 11, as can be seen from FIGS. 6 and 8.

The hinge element 17 may, in the construction shown in FIG. 1, be formed as a leaf spring, which biases the liner flap 16 with prestress into the closed position. In the embodiment shown in FIGS. 1 to 5, opposite to each of the first and second portions of the control ramp 24, there is a counter-surface, not referenced, so that the control ramp 24 in the region of these portions is formed as a slit guide. The liner flap 16 cannot, therefore, be lifted off upwards in these two regions, because the bearing element 23 of the lifting lever 18 is situated in the aforementioned slit guide.

The liner, formed of the lower component 14 and liner flap 16, is releasably engaged with the forward sliding shoe 6 for sliding entrainment of the liner during sliding movements of the sliding lid 3. For this purpose, the front sliding shoe 6 possesses a lateral projection 28, visible in FIGS. 1 and 5, on which there is a backwardly orientated detent nose 29. The detent nose is in snap engagement with a detent spring 30, fixed to the liner lower part 14. This releasable snap connection is especially advantageous for assembling the liner when installing the roof, because the screwing of the sliding lid 3 with its fixing elements to the front sliding shoe and the guide blocks and the positional adjustment of the sliding lid 3 are particularly easy to carry out if the liner is slid back.

As a result of the construction of the sliding roof described and illustrated in the drawings, when the sliding lid 3 is actuated the movement sequences explained below take place. Once again reference is made only to the elements situated on one side of the roof construction, because the movement sequence is corresponding on the opposite side.

If the sliding lid 3, starting from its closed position, is lifted out above the fixed automobile roof 1 by appropriate displacement of the cable 13, acting upon the rear sliding shoe 7, the rear sliding shoe 7, in its forward movement, entrains forwards the lifting lever 18, pivotally journalled on it. The pivot bearing position 19 moves in a straight line parallel to the guide rail 5. After commencement of the forward displacement of the rear sliding shoe 7 on the guide rail 5, the bearing element 23 of the lifting lever 18 runs from the first portion 25 of the control ramp 24 onto the second portion 26. As a consequence of the relatively large ascending slope of the second portion 26, the lifting lever 18 is lifted upwards, pivoting about its pivot bearing position 19, the bearing journal 22, on account of its larger distance from the pivot bearing position 19, travelling through a substantially greater circular arc distance than the bearing element 23. In comparison, the rear sliding shoe 7 travels only a short distance forward, with the result that the sliding lid 3, because of the guiding engagement between guide pin 11 and guide slit 10, pivots through a substantially smaller angular distance than the liner flap 16. During the sliding movement of the bearing element 23 on the second portion 26 of the control ramp 24, therefore, a lead occurs in the movement of the liner flap 16 compared with the sliding lid 3, so that even with a small lift of the sliding lid 3 a comparatively large ventilation gap is formed between the liner flap 16 and the liner lower part 14.

Figure 3:
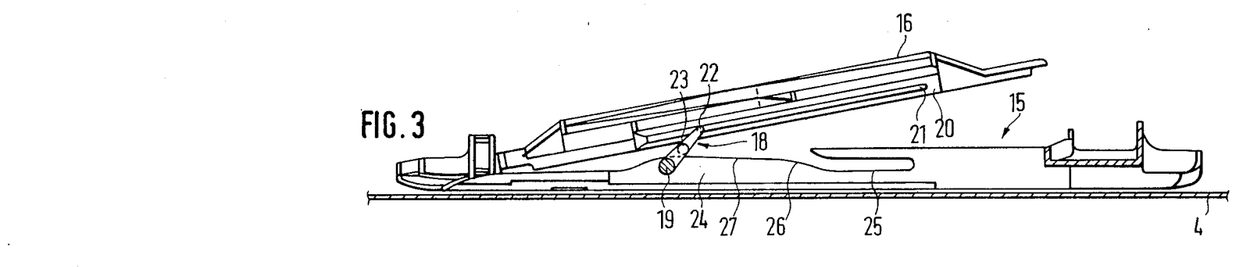
FIG. 3 is a section corresponding to FIG. 2, but shown in the opening position of the liner flap.

In the construction of the control ramp 24 in the embodiment shown in FIGS. 2 and 3, the liner flap 16 has not yet reached its maximum opened position when the bearing element 23 is at the end of the second portion 26. In the embodiment shown in FIGS. 6 to 9, in contrast, the liner flap 16 reaches its maximum opened position, limited by the underside of the sliding lid 3, when the bearing element 23 is situated at the end of the second portion 26 of the control ramp 24.

If the lifting actuation of the sliding lid 3 is continued, then in the embodiment according to FIGS. 6 to 9 the bearing element 23 slides upon the third portion 27' and thus the liner flap 16 cannot open further as the sliding lid 3 rises further with its rear edge. In the embodiment illustrated in FIGS. 2 and 3, in contrast, the bearing element 23 slides upon the slightly forwardly and upwardly ascending third portion 27, causing the liner flap 16 to be pivoted slowly in the opening direction until it reaches its limiting position.

If the sliding lid 3 is to be brought, from its raised ventilation position, back into its closed position, then the reverse movement sequence is carried out for both forms of embodiment. If the sliding lid 3, starting from its closed position, is to be displaced in the opening direction, then the rear sliding shoe 7 is displaced by the cable 13 backwards on the guide rail 5. In this movement, firstly the rear edge of the sliding lid 3 descends, as a result of the shape of the guide slit 10 in the guide block 9. The lifting lever 18, connected with the rear sliding shoe 7, also moves backwards in this case. Its bearing element slides backwards on the first portion 25 of the control ramp 24. It can be seen that the bearing journal 22 of the lifting lever 18, engaging into the lifting block 20, acts here as holding-down device for the liner flap 16. This holding-down function remains effective during the entire sliding travel of the sliding lid 3 in both directions of sliding.

We claim:

1. A sliding and lifting roof for an automobile having a roof and a roof opening, comprising:
   a pair of spaced lateral guide rails with each guide rail fixed adjacent one side of said roof opening:
   a rigid lid;
   a lid liner having a ventilation opening;
   a flap pivoted to said lid liner for opening and closing said ventilation opening;
   said rigid lid being mounted for sliding movement relative to said roof opening by front and rear sliding shoes guided by said guide rails and said being journaled for pivotal movement about a horizontal axis extending transversely to said guide rails by a pivot bearing carried by each of said front sliding shoes;
   a pair of laterally spaced guide blocks fixed to said rigid lid with each guide block adjacent one of said guide rails;
   a pair of lifting blocks fixed to said flap with each lifting block spaced inwardly on one of said guide blocks;
   a pair of control ramps fixed to said lid liner with each control ramp located between one of said guide blocks and an adjacent lifting block and having a control ramp surface comprising successive adjoining portions including a first portion which extends parallel to said guide rails, a second portion inclined upwardly at an angle relative to said first portion and a third portion;
   a guide slit in each of said guide blocks and a guide pin mounted to each of said rear sliding shoes and received in the guide slit in an adjacent guide block to move said guide block in response to movement of said rear sliding shoes;
   a guide slit in each of said lifting blocks;
   a pair of lifting levers with each lifting lever having one end pivotably connected to one of said rear sliding shoes, an opposite end providing a bearing journal received in a respective one of said guide slits in an adjacent lifting block and a bearing element between said one end and said bearing journal with said bearing element bearing on one of said control ramp surfaces;
   means for moving said rear sliding shoes on said guide rails to move said guide pins relative to said guide slits in said guide blocks and thereby move said rigid lid from a closed position to either one of a first position where the rigid lid has been pivoted about said horizontal axis to raise a rear edge, or a second position where said rear edge of said rigid lid has been lowered and said rigid lid has been moved by sliding rearward; and
   said bearing elements of said lifting levers bear on said first portions of said control ramp surfaces during sliding movement of said rigid lid and bear on said second portions of said control ramp surfaces during a starting phase of said pivotal movement of said rigid lid about said horizontal axis to lift said flap relative to said ventilation opening more rapidly than said rigid lid is lifted relative to said roof opening.

2. A sliding and lifting roof according to claim 1, wherein the third portion of each control ramp surface is inclined upwardly at a smaller angle of inclination relative to said first portion than the angle of inclination of the second portion.

3. A sliding and lifting roof according to claim 1, wherein the third portion of the control ramp surface extends parallel to the first portion.

4. A sliding and lifting roof according to claim 1, wherein each of the lifting levers are pivotally connected to the rear sliding shoes to pivot about an axis spaced from and parallel to the guide pin mounted to each respective rear sliding shoes.

5. A sliding and lifting roof according to claim 4, wherein the pivot axis of each lifting lever is horizontally and vertically spaced from the guide pin mounted to each rear sliding shoe and is disposed in front of each guide pin and spaced further away from the rigid lid than the guide pin.

6. A sliding and lifting roof according to claim 1, wherein the lifting levers are each formed as a multi-cranked lever and their respective pivotal connections to their rear sliding shoes, bearing elements and bearing journals are axially parallel to one another.

7. A sliding and lifting roof according to claim 1, wherein the axis of the pivotal connection to the rear sliding shoe, bearing element and bearing journal of each lifting lever are disposed in a common plane which is substantially parallel to the lid liner in the closed position of the rigid lid.

8. A sliding and lifting roof according to claim 1, wherein the lid liner and the control ramps are formed by injection molding as an integral piece of plastic material.

9. A sliding and lifting roof according to claim 1, wherein the flap and the lifting blocks are formed by injection molding as an integral piece of plastic material.

10. A sliding and lifting roof according to claim 1, wherein the first and second portions of the control ramps are formed as slit guides for the bearing elements of the lifting levers.

11. A sliding and lifting roof for an automobile having a roof and a roof opening, comprising;

front and rear sliding shoes guided along guide means for sliding movement along each side of said roof opening;

a sliding lid;

a lid liner for moving with said sliding lid, said lid liner having a flap hinged to said lid liner for pivotal movement relative to said lid liner;

a pair of laterally spaced guide blocks fixed to said sliding lid;

said sliding lid being mounted for sliding movement relative to said roof opening by said front and rear sliding shoes and journaled for pivotal movement about a horizontal axis extending transversely to said roof opening by pivot bearings carried by said front sliding shoes.

a guide pin carried by each of said rear sliding shoes and engaging one of said laterally spaced guide blocks within slot means, a pair of control ramps fixed to said lid liner with each control ramp located adjacent one of said guide blocks and having a control ramp surface;

a pair of lifting levers with each lifting lever having one end pivotably connected to one of said rear sliding shoes, an opposite end engaging said flap and an intermediate portion between said one end and said opposite end and operatively contacting one of said control ramp surfaces; and means for driving said rear sliding shoes to move said guide pins engaging said guide blocks and said sliding lid from a closed position to a position where the sliding lid has been pivoted about said horizontal axis to raise a rear portion of said sliding lid relative to said roof and to move said intermediate portions of said lifting levers on said control ramp surfaces during a starting phase of said pivotal movement of said sliding lid about said horizontal axis to lift said flap relative to said lid liner more rapidly than said sliding lid is lifted relative to said roof opening.

* * * * *